(12) United States Patent
Huber et al.

(10) Patent No.: US 6,386,748 B1
(45) Date of Patent: May 14, 2002

(54) METHOD AND APPARATUS FOR THE PRODUCTION OF HIGH VISCOSITY PASTE PRODUCTS WITH ADDED COMPONENTS

(75) Inventors: Gordon R. Huber; Bradley L. Strahm; Eric S. Sevatson, all of Sabetha; David L. Kesler, Morrill, all of KS (US)

(73) Assignee: Wenger Manufacturing, Inc., Sabetha, KS (US)

( * ) Notice: Subject to any disclaimer, the term of this patent is extended or adjusted under 35 U.S.C. 154(b) by 0 days.

(21) Appl. No.: 09/716,756

(22) Filed: Nov. 20, 2000

Related U.S. Application Data

(62) Division of application No. 09/399,481, filed on Sep. 20, 1999.

(51) Int. Cl.[7] .......................... A21C 1/06; B28B 17/02; A23L 1/025
(52) U.S. Cl. .................. 366/79; 366/108; 366/114; 425/174.2; 99/353
(58) Field of Search .................. 366/79, 97, 98, 366/76.1, 76.2, 76.3, 83, 108, 114, 76.93, 77; 425/174.2, 432; 264/407, 422, 443, 444; 99/353

(56) References Cited

U.S. PATENT DOCUMENTS

| | | | | |
|---|---|---|---|---|
| 3,619,429 A | * | 11/1971 | Torigai | |
| 3,663,668 A | * | 5/1972 | Fairbanks | |
| 4,168,295 A | * | 9/1979 | Sawyer | |
| 4,556,467 A | * | 12/1985 | Kuhn et al. | |
| 4,675,194 A | * | 6/1987 | Gaffney | |
| 4,793,954 A | * | 12/1988 | Lee et al. | |
| 4,802,769 A | * | 2/1989 | Tanaka | |
| 4,935,164 A | * | 6/1990 | Wessling et al. | |
| 5,068,068 A | * | 11/1991 | Furusawa et al. | |
| 5,202,066 A | * | 4/1993 | Furusawa et al. | |
| 5,435,712 A | * | 7/1995 | Probst | |
| 5,468,429 A | * | 11/1995 | Li et al. | |
| 5,538,191 A | * | 7/1996 | Holl | |
| 5,770,131 A | * | 6/1998 | Bubel et al. | |
| 5,799,880 A | * | 9/1998 | Roberson et al. | |
| 5,955,035 A | * | 9/1999 | Dinzburg et al. | |

* cited by examiner

Primary Examiner—Tony G. Soohoo
(74) Attorney, Agent, or Firm—Hovey Williams LLP

(57) ABSTRACT

Combined extrusion/sonolation apparatus (10) which is designed to continuously and efficiently incorporate components (e.g., liquid lipids or fats or meltable solids) into heterogeneous materials in order to form stable products. The apparatus (10) includes an extruder (12) having a barrel (27) and restricted orifice outlet (38); a sonolation device (14) is directly coupled to the outlet (38). Preferably a monitoring unit (50) is located downstream of the sonolation device (14) and is connected via a controller (18) with the extruder (12) and device (14) so as to control the operation of the latter. In use, starting materials are fed into the extruder (12) and are initially mixed, whereupon a component is injected through a barrel-mounted injector pipe (41). The composite extrudate is treated within device (14) by subjecting it to acoustic vibrations.

6 Claims, 3 Drawing Sheets

(2 of 3 Drawing Sheet(s) Filed in Color)

METHOD AND APPARATUS FOR THE PRODUCTION OF HIGH VISCOSITY PASTE PRODUCTS WITH ADDED COMPONENTS

RELATED APPLICATION

This is a division of application Ser. No. 09/399,481, filed Sep. 20, 1999.

BACKGROUND OF THE INVENTION

1. Field of the Invention

The present invention is broadly concerned with an improved method and apparatus for the incorporation of added liquid or meltable solid components into heterogeneous materials. More particularly, the invention pertains to such methods and apparatus wherein the components and other starting materials are continuously passed in serial order through an extruder and a sonolation device.

2. Description of the Prior Art

The commercial-scale production of emulsified products is a common problem encountered by industry. For example, it is sometimes necessary to incorporate oils or lipids into heterogeneous materials such as grains. One way of accomplishing this is to use relatively large quantities of emulsifiers. While this does yield effective emulsions, emulsifiers are very expensive. In another example, it is also sometimes necessary to add liquid ingredients to highly viscous gel or paste products such as toothpastes. In the past, it has generally been necessary to produce such products in a batchwise manner, because of the difficulty of insuring product uniformity.

Extruders are well known devices adapted for production of an almost limitless number of products such as animal or livestock feeds, starches and pastas. Extruders include an elongated barrel having an inlet and a spaced outlet, with one or more elongated, axially rotatable flighted screws located within the barrel for moving materials along the barrel. The outlet end of the barrel is normally equipped with a restricted orifice die serving to create back pressure within the barrel and to form the extrudate into a desired shape. In many instances, extruders are used to simultaneously cook and form materials, and in such cases generate elevated temperatures and pressures. In other cases, extruders can be used at relatively low or even ambient temperatures as forming devices.

Sonolation devices have also been proposed in the past for assisting in the mixing of materials. Such sonolation devices are in the form of elongated, tubular units having an internal orifice and a tunable, blade-like member adjacent the orifice. In use, materials passing through the sonolation device are subjected to intense acoustic vibrations which tend to break up discrete liquid droplets within the material to achieve a more uniform and emulsified final product. Sonolation devices are described in U.S. Pat. Nos. 3,176,964 and 5,854,336, both of which are incorporated by reference herein.

SUMMARY OF THE INVENTION

The present invention provides improved methods and apparatus for the incorporation of liquid components into other materials so as to yield stable final products. Broadly speaking, the methods of the invention involve passing one or more starting ingredients into an extruder and adding other components to such ingredients to form a composite, so that the composite passes through the extruder outlet to give an extrudate. Thereafter, the composite extrudate is treated by subjecting it to acoustic vibrations in a sonolation device.

In preferred forms, the added components can be in liquid form (typically a lipid, oil or lipid- or oil-based material), or as meltable solids (i.e., those which melt during processing). Such added components may be added to the other ingredients within the extruder barrel. This is usually accomplished by injecting the added components into the barrel at a point at least midway along the length of the barrel, and preferably closer to the outlet end thereof than the inlet. While such barrel injection is preferred, the invention is not so limited; if desired, the added components can be initially incorporated into the other starting ingredients, and the combination can then be fed to the extruder.

The composite extrudate is continuously directed under pressure from the extruder to the sonolation device. In order to be most effective, the extrudate should not be collected or held for any significant period between extrusion and sonolation. Preferably, the extrudate should pass through a closed conduit between the extruder and sonolation device, and the time between extrusion and sonolation should not exceed about 1 minute, and preferably should be no more than about 20 seconds.

The final product emerging from the sonolation device is characterized by a uniform color and consistency, and is stable against rapid separation of materials. This is accomplished with the complete elimination, or at least substantial reduction, of emulsifiers or other similar ingredients.

BRIEF DESCRIPTION OF THE DRAWINGS

The file of this patent contains at least one drawing executed in color. Copies of this patent with color drawing(s) will be provided by the Patent and Trademark Office upon request and payment of the necessary fee.

DETAILED DESCRIPTION OF THE PREFERRED EMBODIMENT

Figure 1:
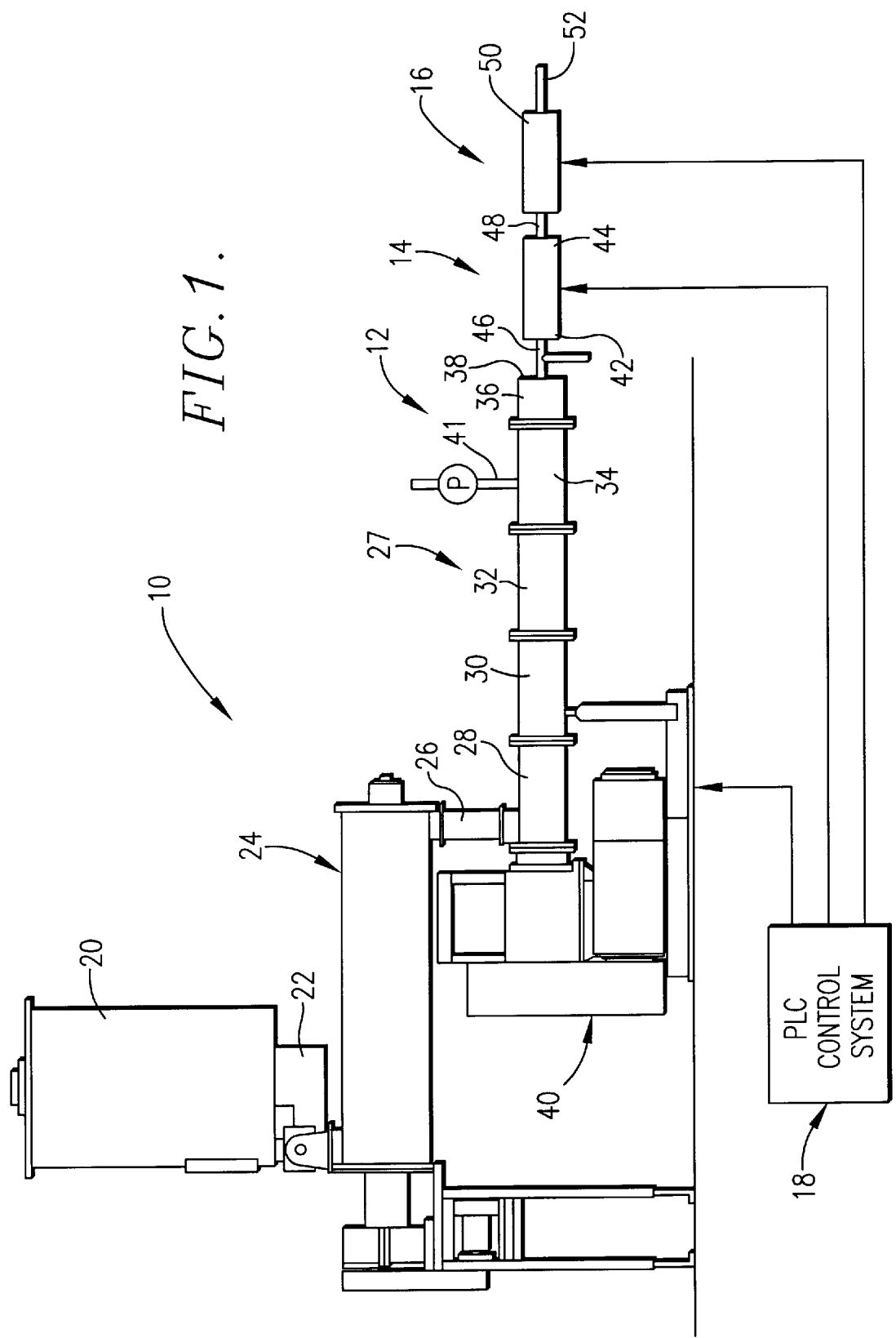
FIG. 1 is a schematic side elevational view of the preferred apparatus in accordance with the invention, including a twin screw extruder, Sonolator and Micromotion meter coupled in series.

Turning to FIG. 1, a combined extruder/sonolation apparatus 10 is illustrated. Broadly, the apparatus 10 includes an extruder 12, sonolation device 14, monitoring unit 16 and a programmable logic controller (PLC) 18. The apparatus 10 is designed to continuously process starting ingredient(s) in the extruder 12, and to incorporate into such ingredients other components not readily mixable or dispersible in the starting ingredients. For example, liquid components such as lipids or fats to create stable emulsion (either oil-in-water or water-in-oil) composite products, either with the complete elimination or drastic reduction in the amount of emulsifier(s) otherwise necessary.

In more detail, the extruder 12 is preferably a twin screw extruder of the type commercialized by Wenger Manufacturing, Inc. of Sabetha, Kans. In the form shown, the extruder 12 is coupled to a dry ingredient bin 20 having a feeder 22 leading to a preconditioner 24. The preconditioner 24 is advantageously a Wenger DDC-type preconditioner, comprising a pair of flighted mixing shafts within a specially configured housing. As those skilled in the art will appreciate, the preconditioner 24 is typically equipped with water injectors so as to hydrate ingredients prior to extrusion thereof. As materials are treated within the preconditioner 24, they are continuously passed via transition chute 26 to extruder 12.

The extruder 12 includes a barrel 27 made up of a plurality (here 5) of axially interconnected, tubular head sections, namely inlet head 28, intermediate head sections 30, 32, 34 and outlet head section 36. A pair of elongated, interfitted, helically flighted screws (not shown) are situated within the barrel 27 for moving material from inlet head 28 through the barrel and ultimately out the forward end thereof. At such forward end, a die plate 38 is provided, which includes one or more restricted orifices. A variable speed drive assembly 40 is operable to rotate the extruder screws.

In the illustrated embodiment, the fourth head 34 of barrel 27 is equipped with an injector pipe 41 having a pump P interposed therein. This permits injection under pressure of added components into the confines of barrel 27 during operation of extruder 12.

The sonolation device 14 includes an input end 42 and an opposed outlet end 44. The inlet end 42 is coupled via a three way valve conduit 46 to die plate 38 so that extrudate from the extruder 12 continuously passes into the sonolation device. The sonolation device is of the type commercialized by Sonic Corporation of Stanford, Conn. These devices are well known and are described in U.S. Pat. No. 3,176,964. In general, however, a sonolation device of this character operates by converting the kinetic energy of a high pressure, high velocity stream into a high intensity mixing action. Such conversion is accomplished by pumping a flowable material through an orifice within the sonolation device against a blade-like obstacle located in the material stream, resulting in a high level of cavitation, turbulence and shear. The blade-like obstacle is brought into an ultrasonic vibration by the fluid motion, causing cavitation in the fluid. The cavitation (a phenomenon in which small gas bubbles in the material grow until they implode with very high local energy dissipation) serves to break up any large droplets or particles in the material to create a uniform final product.

The outlet end 44 of device 14 is coupled via a conduit 48 with a monitoring unit 50. The unit 50 (preferably a Micromotion meter) is designed to continuously monitor one or more physical parameters of the product emerging from the sonolation device, such as flow rate, pressure and specific gravity. As shown, the unit 50 includes an outlet pipe 52, where the final product from apparatus 10 may be collected. In preferred forms, the unit 50 is operably coupled with the PLC 18. The PLC is programmed, using known software, so as to control the operation of extruder 12 and/or sonolation device 14 in response to inputs received from unit 50. That is, the controller 18 receives inputs from the device 50 representative of one or more measured physical parameters, and generates outputs to the extruder 12 and/or sonolation device 14 for altering a process condition thereof. To give but one example, the specific gravity of the product emerging from the sonolation device 14 may be measured by the unit 50, and this information may be used to control the rotational speed of the extruder screws, which in turn affects specific gravity.

In the use of apparatus 10, starting materials may be fed from bin 20 or any other suitable source for passage through preconditioner 24 and ultimately into barrel 27 of extruder 12. During passage of such starting material through the barrel 27, water may be added as desired (typically at heads 1 or 2) and the starting ingredients are thoroughly mixed and hydrated. This action continues in a high intensity mixing action upstream of injector pipe 41. At injector pipe 41, a component to be added the like is injected under pressure into the barrel 27. Downstream of the injector 41, further intense mixing is carried out so as to deliver a uniformly mixed composite extrudate to the sonolation device 14.

The extrudate is treated in the sonolation device 14 by subjecting it to acoustic vibrations. The intensity of these vibrations may be altered in the device 14, which is generally accomplished by slight changes in the location of the tuning blade adjacent the sonolation orifice. It is necessary that the extrudate delivered to sonolation device 14 be under pressure. In some instances, the extruder may be incapable of pressurizing the extrudate to the extent desired; accordingly, in those cases it may be necessary to add a pump (e.g., a positive displacement gear pump) between the outlet end of the extruder and the inlet 42 of sonolation device 14.

The conditions within preconditioner 24 and extruder 12 are extremely variable, depending upon the type of material being processed. For example, preconditioning is normally carried out at essentially atmospheric temperature, and time is a consideration only from the standpoint of achieving adequate prehydration. In the extruder barrel, pressure conditions can vary from a level of from about 10–4000 psi, and more preferably from about 500–2000 psi. Temperature conditions usually range from about 20–200° C., and more preferably from about 30–80° C.

The extrudate delivered to sonolation device 14 should be at a pressure of at least 200 psi, more preferably from about 300–2000 psi, and most preferably from about 350–700 psi. Extrudate temperature is generally not a consideration for proper operation in the device 14.

A virtually unlimited number of materials can be processed in the apparatus 10. Grain-based starting ingredients such as soy, wheat, corn, oats, and rice can readily be employed and also materials such as starch, collagen and glycerin can be used. More specifically, grain materials mixed with water at a level of from about 40–70% wb can be mixed with oil or lipid components at a level of from about 10–30% by weight of the grain/water. Likewise, mixtures containing collagen, about 20–50% wb water and 10–30% wb glycerin can be mixed with 10–30% oil or lipid, based upon the weight of the collagen/water/glycerin mixture taken as 100%. Finally, mixtures of any type of starch with about 20–50% wb water and 10–30% wb glycerin can be mixed with oil or lipid at a level of from about 10–35% by weight, based upon the weight of the starch/water/glycerin mixture taken as 100%. Apart from these types of starting materials, dyes, pigments or the like can be successfully added to base ingredients.

The following example sets forth a preferred apparatus and process for the production of an extruded oil/water emulsion product in accordance with the invention. It is to be understood, however, that this example is provided by way of illustration and nothing therein should be taken as a limitation upon the overall scope of the invention.

EXAMPLE

A combination extruder and Sonolator apparatus was configured as illustrated schematically in FIG. 1. The apparatus included a Wenger DDC preconditioner of the type described in U.S. Pat. No. 4,752,139, incorporated by reference herein. The preconditioner was coupled with a Wenger TX-57 twin screw extruder equipped with a total of five interconnected tubular heads; the fourth head included an injection port allowing injection of a liquid ingredient into the barrel. The twin flighted screws within the barrel were configured to define, in the barrel section upstream of the injection point, a rapid intense mixing zone. Downstream of the injection point, the screw configuration generated a rapid, intense dispersion zone. The outlet of the extruder barrel was a simple, single opening plate die having an opening of approximately of ⅜ diameter. A three-way valve was coupled to the plate die opening and to a downstream Sonolator. A Micromotion meter was coupled to the outlet of the Sonolator in order to measure specific gravity, temperature and flow rate of the product emerging from the Sonolator.

In particular, the TX-57 machine was made up of the following components, where all parts numbers are those of Wenger Manufacturing, Inc. of Sabetha, Kans. Extruder barrel head sections—55618-001, 55607-001, 55618-001, 55807-001 and 55619-001; extruder shafts—55627-009; rotating elements mounted on the first extruder shaft, from the inlet to the outlet end of the barrel—55657-003, 55657-003 B, 55625-003, 55625-003, 55624-201, 55624-201 B, 55625-103 B, 55624-201, 55624-201 B, 55657-103, 55654-401, 55654-401 B, 55657-103, 55684-101 O, 55664-103+, 55664-101+, 55664-103+, 55624-101 O, 55624-101+, 55624-102+, 55626-107, 55624-201, 55625-003, 55625-003, 55624-201, 55624-201 B, 55626-103, 55624-101 O, 55624-101+, 55624-101+, 55624-101 O, 55624-101+, 55624-101+, 55626-103, 55624-101 O, 55624-101+, 55624-101+, 55624-103 O, 55624-10355624-101+, 55626-103, and 55620-005; rotating elements mounted on the second extruder shaft, from the inlet to the outlet end of the barrel—55657-203, 55657-203, 55625-003, 55625-003, 55624-201, 55624-201 B, 55625-103 B, 55624-201, 55624-201 B, 55657-103, 55654-401, 55654-401 B, 55657-103, 55684-101 O, 55664-103+, 55664-101+, 55664-103+, 55624-101 O, 55624-101+, 55624-102+, 55626-107, 55624-201, 55625-003, 55625-003, 55624-201, 55624-201 B, 55626-103, 55624-101 O, 55624-101+, 55624-101+, 55624-101 O, 55624-101+, 55624-101+, 55626-103, 55624-101 O, 55624-101+, 55624-101+, 55624-103 O, 55624-103+ 55624-103+, 55626-103, and 55620-005; extruder die/adapter—55661-029 AD, 74002-099 NA.

The starting material used in this test was standard soy flour (6% moisture). This soy was delivered via a dry ingredient bin (45 kg/hr) to the preconditioner, where it was mixed with room temperature water for hydration purposes. After preconditioning, the hydrated soy was fed to the inlet of the extruder. During passage through the extruder barrel, additional water was injected into the soy and, at the fourth head, vegetable oil was injected. The hydrated soy/vegetable oil composite extrudate was then passed through the plate die and in serial order through the Sonolator and Micromotion meter to create a water/oil emulsion product. During processing, parameters measured by the Micromotion meter (flow rate, pressure, specific gravity) were used as feedback through a PLC to control the extruder and Sonolator operations, thereby achieving a uniform final product. In order to determine the effect of sonolation, a three-way valve was operated intermittently to collect product sample directly from the extruder prior to sonolation.

The following table sets forth the run conditions:

|  |  | RUN #1 |
|---|---|---|
| RAW MATERIAL INFORMATION | | |
| Dry Recipe Density | kg/m³ | 503 |
| Feed Screw Speed | rpm | 8 |
| Dry Recipe Rate | g/hr | 45 |
| PRECONDITIONING INFORMATION | | |
| Preconditioner Speed | rpm | 350 |
| Water Flow to Preconditioner | kg/hr | 32 |
| Preconditioner Discharge Temperature | ° C. | 24 |
| Preconditioner Discharge Moisture Content | % wb | 4.5 |
| EXTRUSION INFORMATION | | |
| Extruder Shaft Speed | rpm | 400 |
| Motor Load | % | 34 |
| Water Flow to Extruder | kg/hr | 98 |
| Vegetable Oil to Extruder | kg/hr | 30 |
| FINAL PRODUCT INFORMATION | | |
| Extruder Discharge Moisture | % wb | 75.8 |
| Extruder Discharge Oil Content | % wb | 14.6 |
| Extruder Performance | | Stable |

Figure 2:
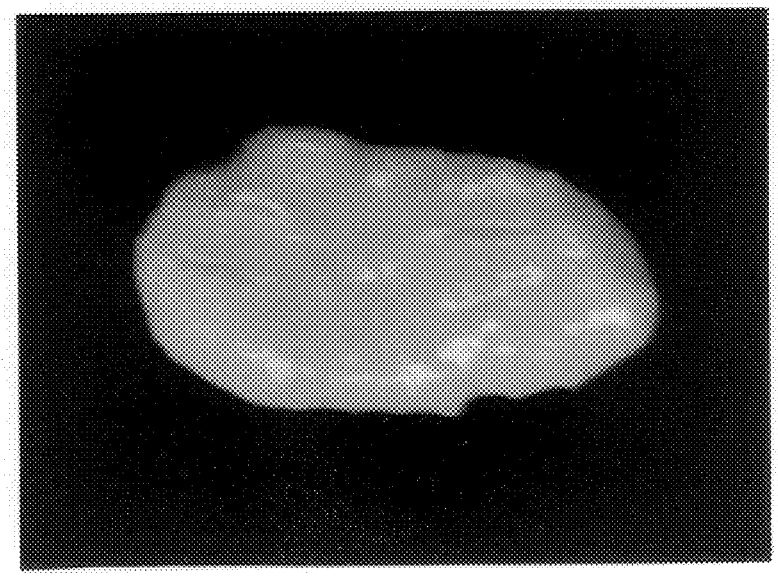
FIG. 2 is a photograph depicting a sample of a hydrated soy/vegetable oil product from the extruder of the preferred apparatus, prior to sonolation.
Figure 3:
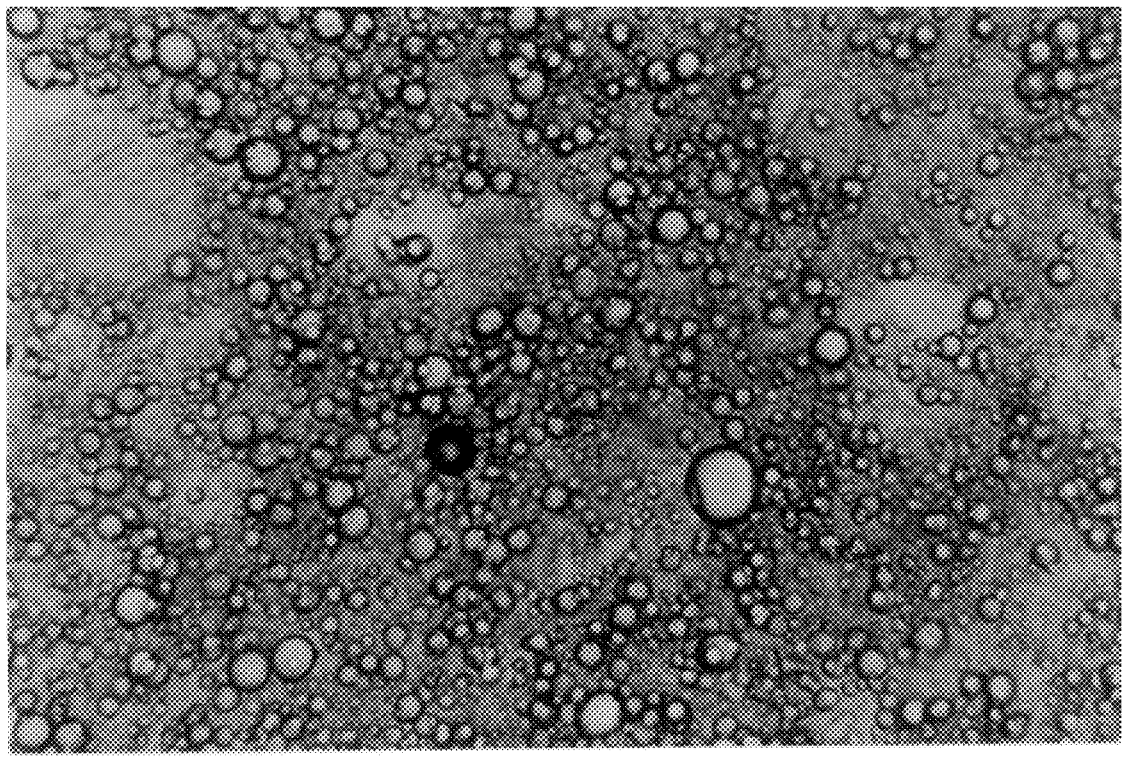
FIG. 3 is a microphotograph (100x) of the sample shown in FIG. 2, illustrating the presence of large oil droplets in the product.
Figure 4:
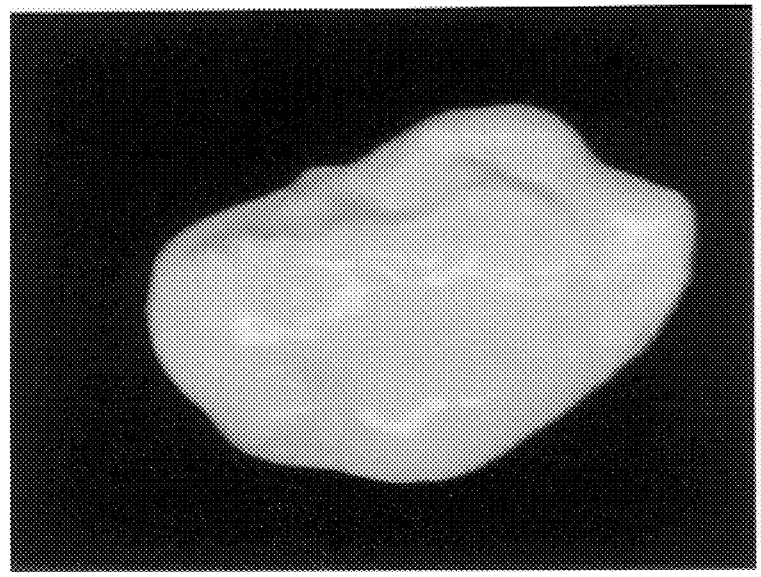
FIG. 4 is a photograph similar to that of FIG. 2 but depicting a sample of the hydrated soy/vegetable oil product after extrusion and sonolation.
Figure 5:
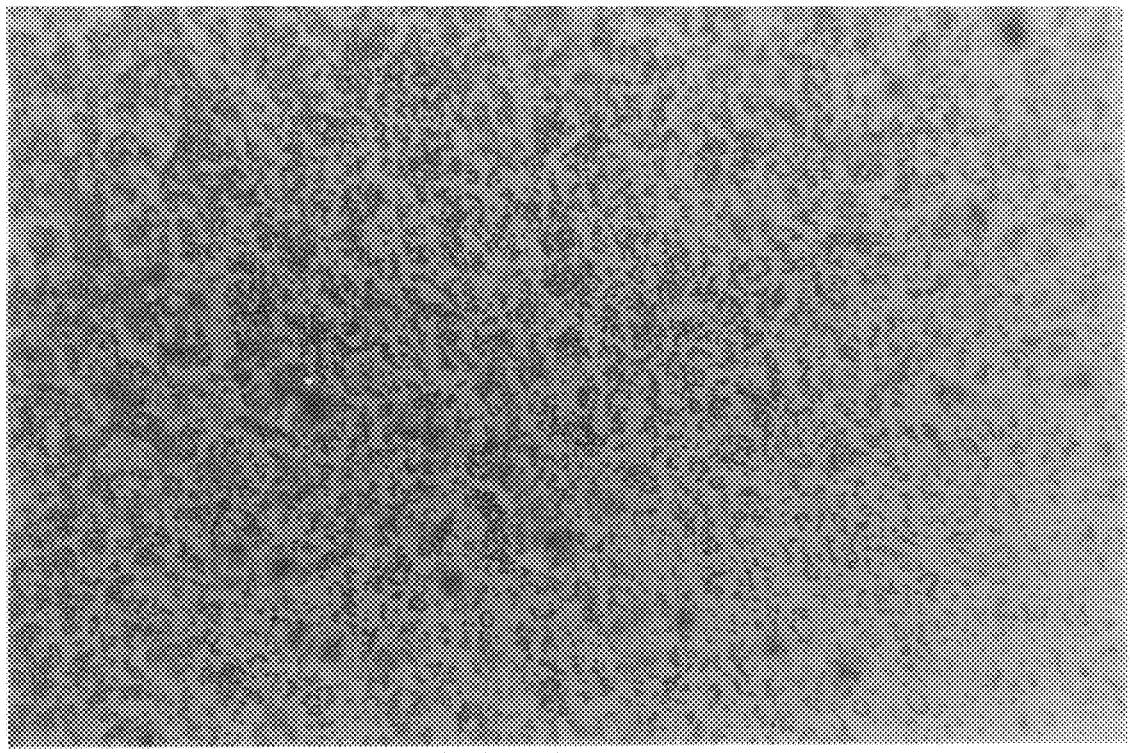
FIG. 5 is a microphotograph (100x) of the sample shown in FIG. 4, illustrating that the sonolated product did not exhibit large, discernible oil droplets.

FIGS. 2–3 are photographs of the hydrated soy/vegetable product directly from the extruder without sonolation. As best seen in FIG. 3 (a 100× magnification), the product exhibited discrete oil droplets indicating that separation of the oil was already taking place. These oil droplets gradually came out of the product. FIGS. 4–5 are similar photographs of the product after sonolation. This product had a rich, smooth, creamy and less oily light appearance, as compared with the non-sonolated product of FIGS. 2–3. The FIG. 5 100× magnification demonstrates that oil droplets are small enough to maintain the oil in suspension indefinitely.

We claim:

1. Apparatus for incorporating a component into an extrudate, comprising:
    an extruder having an elongated barrel presenting a material inlet and a restricted extrudate outlet, and an elongated, helically flighted axially rotatable screw within the barrel and operable for moving material from the inlet towards and through said outlet;
    an injector operably coupled with said barrel permitting injection of said component into the barrel for mixing with materials passing therethrough; and
    a sonolation device comprising a tubular body with an extrudate inlet and extrudate outlet, said inlet coupled with said restricted extrudate outlet for passage of the extrudate through the tubular body, and a blade-like obstacle within said tubular body which can be brought into ultrasonic vibration by fluid motion,
    said sonolation device being capable of subjecting the extrudate to acoustic vibrations.

2. The apparatus of claim 1, including a preconditioner separate from said extruder and operable to initially hydrate said material, said preconditioner including an outlet operably coupled with said barrel inlet.

3. The apparatus of claim 1, said injector including a positive pressure pump for injecting said component into said barrel under pressure.

4. The apparatus of claim 1, including a conduit extending between said barrel outlet and said sonolation device for conveying said extrudate to the sonolation device.

5. The apparatus of claim 1, including a monitoring device connected with said extrudate outlet for measuring a physical parameter of said extrudate after passage through the extrudate outlet.

6. The apparatus of claim 5, including a controller operably coupled with and capable of receiving an input from said monitoring device representative of said measured physical parameter, and said controller operably coupled with said extruder and sonolation device capable of generating an output to one of said extruder and sonolation device for altering the operation of one of said extruder and said sonolation device thereby modifying a process condition.

* * * * *